(12) United States Patent
Vachon

(10) Patent No.: US 11,058,072 B2
(45) Date of Patent: Jul. 13, 2021

(54) CLAMP FOR SUPPORTING FLEXIBLE TUBES

(71) Applicant: LE GROUPE DSD INC., Thetford Mines (CA)

(72) Inventor: Leandre Vachon, Thetford Mines (CA)

(73) Assignee: LE GROUPE DSD INC., Thetford Mines (CA)

( * ) Notice: Subject to any disclaimer, the term of this patent is extended or adjusted under 35 U.S.C. 154(b) by 0 days.

(21) Appl. No.: 16/698,647

(22) Filed: Nov. 27, 2019

(65) Prior Publication Data
US 2020/0163290 A1 May 28, 2020

(30) Foreign Application Priority Data

Nov. 28, 2018 (CA) .................................. CA 3025674

(51) Int. Cl.
*A01G 23/10* (2006.01)
*F16L 3/10* (2006.01)

(52) U.S. Cl.
CPC ................. *A01G 23/10* (2013.01); *F16L 3/10* (2013.01)

(58) Field of Classification Search
CPC .......... A01G 23/10; F16L 3/10; F16L 3/1008; F16L 3/105; F16L 3/1091; B60R 16/08; F16B 2/02; F16B 2/14; F16B 2/06; F16B 2/12; F16B 9/023; F16B 2200/406; A47B 57/54
See application file for complete search history.

(56) References Cited

U.S. PATENT DOCUMENTS

| | | | |
|---|---|---|---|
| 1,186,741 A | 6/1916 | Brower | |
| 2,877,601 A | 3/1959 | Griggs | |
| 2,944,369 A | 7/1960 | Soule | |
| 2,958,158 A | 11/1960 | Hatton | |
| 3,046,698 A | 7/1962 | Breen et al. | |
| 3,069,189 A * | 12/1962 | Hollaender | E04G 7/14 403/385 |
| 3,156,069 A | 11/1964 | Lamb | |
| 3,987,930 A | 10/1976 | Fuson | |
| 4,222,538 A * | 9/1980 | Jensen | B60T 17/046 248/56 |
| 4,299,053 A | 11/1981 | Foote | |
| 4,366,648 A | 1/1983 | Morin | |
| 4,379,472 A | 4/1983 | Cunningham | |

(Continued)

FOREIGN PATENT DOCUMENTS

CA 652576 A 11/1962
CA 845384 A 6/1970
(Continued)

OTHER PUBLICATIONS

Machine translation in English of FR-1410342.

*Primary Examiner* — Christopher Garft
(74) *Attorney, Agent, or Firm* — IPAXIO S.E.N.C.

(57) ABSTRACT

The clamp includes a hollow base having an open top side, two opposed open ends, and an inner sidewall bordering a bottom side as well as two opposite lateral sides of the base. The inner sidewall defines a passage extending between the two opposite open ends and through which a flexible tube can pass. The clamp also includes a slidable part inserted into the base at one of its ends to close its top side. The proposed concept is particularly advantageous for sugar making.

20 Claims, 12 Drawing Sheets

(56) References Cited

U.S. PATENT DOCUMENTS

| | | | |
|---|---|---|---|
| 4,512,104 A | 4/1985 | Lamb | |
| 4,887,812 A * | 12/1989 | Moormann | A63B 63/083 473/487 |
| 5,005,314 A | 4/1991 | Chabot | |
| 5,054,820 A | 10/1991 | Lesquir et al. | |
| 5,224,289 A | 7/1993 | Buzzell | |
| 5,303,504 A | 4/1994 | Buzzell | |
| 5,330,140 A * | 7/1994 | Cseri | F16L 3/10 248/74.2 |
| 5,380,326 A * | 1/1995 | Lin | A61B 17/7032 403/13 |
| 5,395,079 A * | 3/1995 | Jensen | F16L 3/10 248/62 |
| 5,588,166 A * | 12/1996 | Burnett | A61G 7/05 248/214 |
| 6,370,818 B1 | 4/2002 | Chabot et al. | |
| 6,454,312 B1 | 9/2002 | Desorcy et al. | |
| 8,359,788 B2 | 1/2013 | Leger et al. | |
| 8,424,242 B2 | 4/2013 | Perkins | |
| 8,640,382 B2 | 2/2014 | Decker | |
| 8,677,682 B2 | 3/2014 | Cote et al. | |
| 9,433,156 B2 | 9/2016 | Vachon | |
| 9,435,476 B2 | 9/2016 | Vachon | |
| 10,412,906 B2 | 9/2019 | Perkins et al. | |
| 10,557,319 B2 * | 2/2020 | Daniels | E21B 41/0021 |
| 2012/0043432 A1 * | 2/2012 | Heitmeyer | F16L 3/10 248/68.1 |
| 2013/0206938 A1 * | 8/2013 | Clouser | A47B 57/567 248/219.4 |
| 2013/0318868 A1 | 12/2013 | Leger et al. | |
| 2015/0167868 A1 | 6/2015 | Boncha | |
| 2016/0270308 A1 | 9/2016 | Desorcy et al. | |
| 2017/0089490 A1 * | 3/2017 | Foxx | F16B 2/14 |
| 2018/0292028 A1 * | 10/2018 | Gossack | F16G 11/101 |
| 2018/0298929 A1 * | 10/2018 | Lund | A61M 5/1415 |
| 2019/0331277 A1 | 10/2019 | Vachon | |

FOREIGN PATENT DOCUMENTS

| | | |
|---|---|---|
| CA | 1105400 A | 7/1981 |
| FR | 1410342 A | 8/1965 |

\* cited by examiner

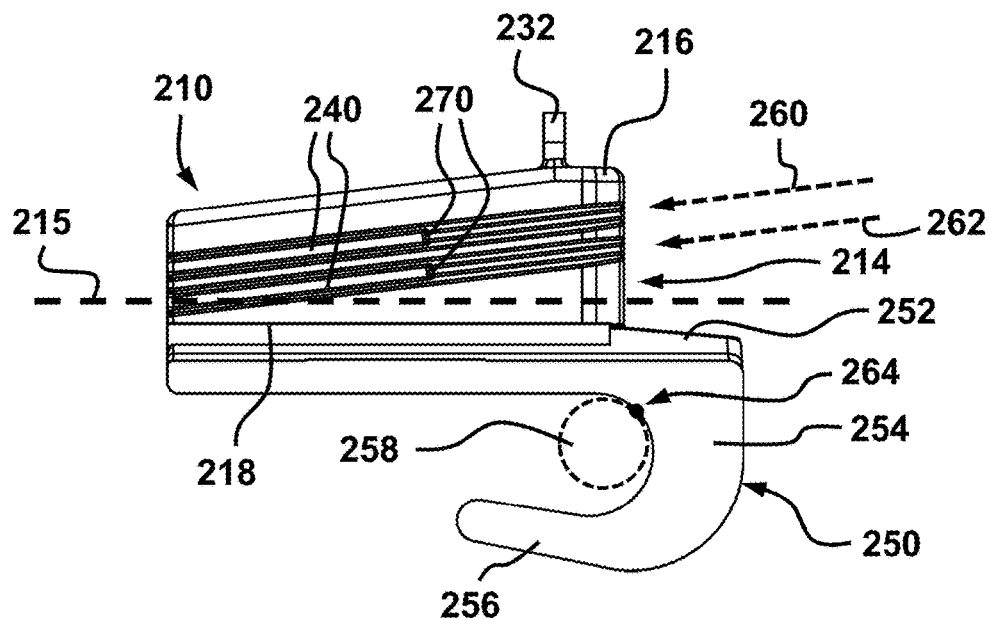
FIG. 3
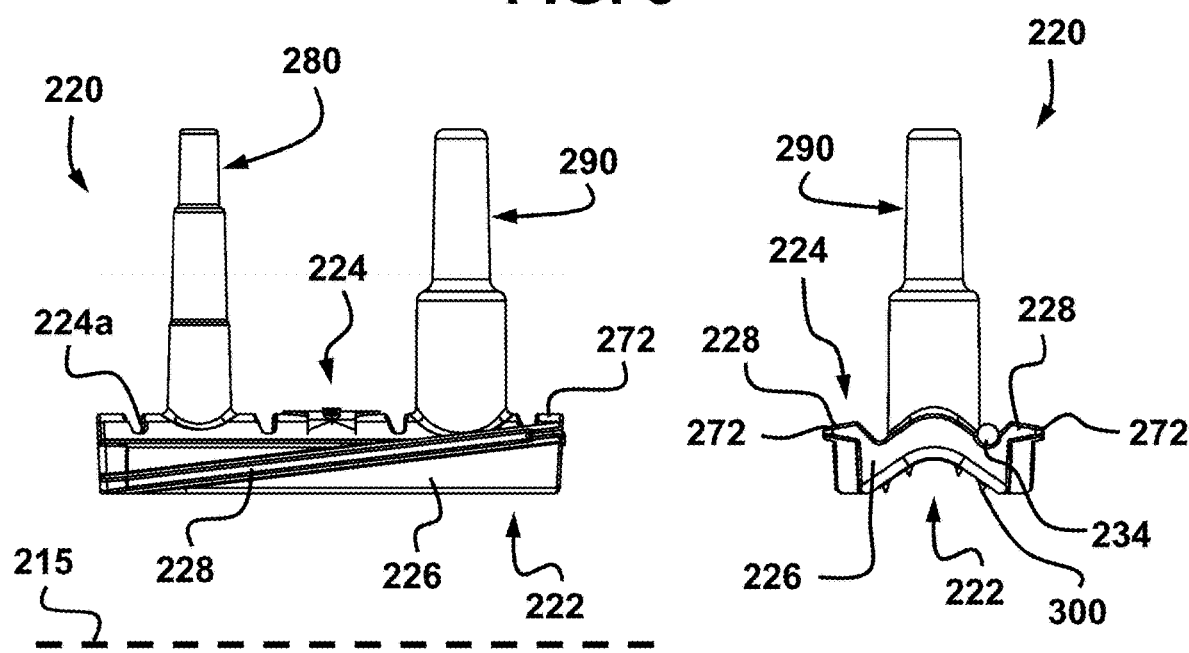
FIG. 4
FIG. 5

CLAMP FOR SUPPORTING FLEXIBLE TUBES

CROSS-REFERENCE TO RELATED APPLICATION

The present case claims the benefit of Canadian patent application No. 3,025,674 filed on 28 Nov. 2018, which application is hereby incorporated by reference in its entirety.

TECHNICAL FIELD

The technical field relates generally to the anchoring of flexible tubes, for instance flexible tubes to transport fluids, especially those in the field of maple sugaring.

BACKGROUND

Maple sugaring refers generally to the harvesting and the processing of tree sap, especially from sugar maples, into various products. Other species of trees have a sap whose sugar content makes it possible to obtain products similar to those of sugar maple, for instance yellow birch, sugar birch, hickory, basswood, etc. However, sugar maples are more common and maple sugaring is more associated with sugar maple than any other species. It should be noted that in the following text, a direct or indirect reference to sugar maples, as an example of implementation, does not exclude having other similar species of trees.

A sugar bush is a wooded area where there are many sugar maples and where it is possible to harvest the sap of these trees in large quantities at certain times of the year, mainly in the spring. The sap is harvested by drilling a hole in the trunk of a tree and installing a corresponding spout through which the sap will flow under suitable weather conditions.

The most efficient way of harvesting sap, which is also the least invasive or damaging to trees, is to use a small diameter tap hole and a corresponding spout connected to a tubing network that allows the sap to be transported towards a destination point, for instance a reservoir, a tank or any other suitable location. The tubing network comprises, among other things, a tubing formed by a multitude of interconnected tube segments. The interior of the tubing network is under a vacuum, namely that the absolute pressure therein is below the ambient atmospheric pressure. This relative pressure differential between the interior and the exterior of the tubing is referred to hereafter as a negative pressure.

The tubing of a tubing network generally includes tubes which are increasingly larger in diameter from upstream to downstream. Those with the largest diameters are referred to hereafter as main conduits. The other tubes are referred to hereafter as secondary conduits. In maple sugaring, secondary conduits are usually tubes made of a relatively flexible material and which has a certain elasticity. These tubes are referred to hereafter as being flexible tubes. The material may be for instance a polymer. Other kinds of materials are possible.

It should be noted that in the text, the word "tube" has generally a generic meaning and, among other things, is a synonym for words such as "pipe", "conduit" and "line".

The installation, operation and maintenance of a tubing network in a sugar bush are not without problems and challenges. It usually requires an extensive workforce and to operate under conditions that can be very demanding, especially because it is often cold and wet when the work is to be done. Some locations may also sometimes be quite far in the forest and can be difficult to access, especially when the ground is covered with snow. Moreover, carrying out a task that would be relatively simple in a workshop often becomes complex and difficult when the same task is done in a forest.

The tubing in a sugar bush is generally installed at a given height above the ground because it is desirable that the tubing network be generally sloping substantially downward towards the destination point. The fact that the tubing in a sugar bush is substantially downhill allows, among other things, the sap to move under the combined action of gravity and that created by the suction, the latter being the result of the negative pressure. The tubes overhang the ground and are suspended between anchor points. The tubes can be attached directly to the trees or other kinds of supports, depending on the needs and what is available at the location. The other kinds of supports may be, for instance, poles, stakes, linear supports or other nearby objects. The linear supports may be, for instance, taut cords, metallic wires or even other suspended tubes that have been previously installed. These linear supports are generally disposed substantially horizontally and are themselves attached to trees or other objects. Variants of the above examples are possible, and many other implementations can be devised.

The flexible tubes are usually taut so that they remain relatively straight between the anchor points and they are often not supported over their entire length. The other tubes, especially the main conduits, are often held by one or more linear supports that extend above these tubes and support them at multiple locations. Other configurations and arrangements are possible.

Moreover, some sections of tubing may be leveled, but ideally, no part of the tubing network should slope upward in the direction of flow and no tube segment should be lower than an adjacent downstream segment. This latter situation is referred to hereafter as a low point. Among other things, a low point may occur when a suspended flexible tube has not been properly taut or is no longer sufficiently taut between two anchor points. The tube then collapses under its own weight and, if applicable, the weight of the sap therein. A local collapse becomes a place where sap can accumulate and even stagnate. The flow of sap in this part of the circuit will be more difficult and maintaining a suitable negative pressure upstream can also be problematic.

The flexible tubes should be sufficiently taut between two anchor points during their installation and remain taut thereafter. This requirement, however, makes the tubing installation process much more complex and tedious. The tubing should also be regularly inspected as several factors may affect the positioning of the flexible tubes during a harvest season. Many readjustments are often required.

It should be noted that there are mainly two subcategories of secondary conduits, namely the flexible tubes used for the horizontal transportation of the sap and those which are provided only to make a short junction between two superimposed locations, for instance between the outlet of a spout and an adjacent flexible tube for transportation. Because they are relatively short and are generally oriented vertically, the flexible junction tubes usually do not have to be taut like the substantially horizontal flexible tubes for transportation. For the sake of simplicity, and unless otherwise indicated, the term "flexible tube" in the following text refers essentially to a substantially horizontal flexible tube for sap transportation.

There are products on the market to create an anchor point for holding one of the ends of a flexible tube that should be taut. These products have, among other things, a retaining element, for instance a hook located under their main body, to attach them to a linear support or any other suitable support. Unfortunately, in practice, there is often a local pivoting of the flexible tube on which such product is installed. This pivoting then often forms a kink on the tube, near the anchor point, and the creation of a low point. Like the low point, kinking of a flexible tube is not desirable because a kink suddenly decreases its inner diameter, thereby creating an obstruction that will hinder the flow. The obstruction can even create a site where bacteria and dirt can accumulate. In general, the larger the diameter of the tube, the greater the phenomenon of kinking.

The sap can freeze inside the tubing as soon as the outdoor temperature drops below freezing. Then, when the temperature rises sufficiently to allow the frozen sap to melt, small amounts of partially melted sap but still being relatively large can begin to travel along the circuit, especially under the effect of suction or because they are pushed by sap further upstream under the effect of gravity. A thaw is often a very favorable time for sap harvesting and any obstruction along the branches of the tubing network will slow down the flow. Kinking of the flexible tubes increases the risk of clogging caused by a buildup of frozen sap pieces immediately upstream of the kinks. It is therefore desirable to avoid any kinking.

Another difficulty in the field is that a worker who installs or maintains a tubing network should always have at hand a plurality of fittings of all sizes to meet any possible needs because the products available on the market are designed for use with a flexible tube of a specific diameter. On site, the worker will have to continually assess the part size at each given location and then find one exemplar of it among all the carried parts. This situation prolongs the time required to complete each intervention from a few seconds to a few minutes. The wasted time accumulates over the day and can quickly become very substantial at some point. The risks that a worker prematurely uses all exemplars of a specific size and is then required to leave the work site to resupply are also increased. Such situation will further increase the wasted time.

In maple sugaring, it is desirable that the tubing network is perfectly airtight everywhere, namely that there are no micro-leaks along the circuit. A micro-leak results from an imperfect sealing at the junction between two components and allows a small amount of ambient air to continually enter the tubing when operating at a negative pressure. The sap present in the circuit can freeze even when the outdoor temperature is above the freezing point because a high-pressure drop between the inside and outside of the tubing will create a relatively significant air expansion after it has passed through very small airways. This expansion will lower the air temperature once inside the tubing. Moreover, it can be very difficult to maintain a suitable negative pressure in some parts of the tubing network, or even in the entire network, if there are many micro-leaks at nearby locations. The larger the tubing network, the greater the risks of problems at this level.

The junctions between the ends of the flexible tubes and the other components through which a portion of the sap flow circuit passes are places where micro-leaks can occur. Different methods and procedures can be used to secure the open end of each flexible tube to another component for obtaining an optimum sealing. For instance, it is common to use one or more slightly oversize circumferential grooves around a cylindrical portion on which the open end of a flexible tube is secured to create an interfering engagement. This kind of connection can often be strong enough to prevent the flexible tube from being accidentally detached during use, even when subjected to a relatively large pulling force. A great resistance to detachment, however, has the disadvantage that it will also be very difficult, perhaps even impossible, to remove the connection intentionally after it is made without having to cut the flexible tube and thus create a new open end. Although interfering engagements are still useful, it is generally desirable to avoid them whenever possible, for instance by using other methods or systems, or to reduce their number to a bare minimum.

A tubing network typically has many branches, and each of them ends with a flexible tube segment which is upstream all the others. The last segment of flexible tube for transporting the sap is hereinafter referred to as an end of line. In other words, the sap circuit does not extend upstream beyond an end of line, with the exception of components such as spouts and their corresponding flexible junction tubes. An end of line is often associated with a spout, but other situations are possible. For instance, an end of line may be a location where a pressure gauge is provided to measure the relative pressure at that specific point in the tubing network, or it may simply be an uncompleted, non-operational branch of the tubing network where its most upstream open end is blocked. There are many other possibilities.

Currently, a transition piece can be provided at the upstream open end of the end of line to create an anchor point and then allow stretching the flexible tube of this end of line. This transition piece is particularly useful if there is a spout because it is generally not desirable that a spout be used as an anchor point, especially if the traction forces are potentially significant. The spout could otherwise be pulled out of its tap hole. The transition piece will make it possible to attach the end of line to a suitable support and to join the end of line to the spout using a flexible junction tube. The flexible junction tube will be positioned so as to minimize the risk that the spout be dislodged accidentally during the harvest season. The transition piece generally comprises a hook, a handle or other kind of retaining elements for attaching it to a tree or any other kind of suitable support. Moreover, the transition piece can be attached to a tree using a flexible tube stub, which is used only for mechanical connection purposes. The stub passes around the trunk of a nearby tree and its free ends can be attached using a knot or other methods. Variants are also possible.

A transition piece can be very useful, but it may also have some disadvantages, such as the fact that it increases the total number of junctions. Thus, between the spout and the upstream end of the end of line, three junctions are necessary, namely a first between the outlet of the spout and the inlet of the flexible junction tube, a second between the end of the flexible junction tube and the inlet of the transition piece, and a third between the outlet of the transition piece and the upstream open end of the end of line. Another disadvantage of a transition piece is often that during its installation, the worker should cut the end of line to a specific length so that it is well tensioned between this anchor point and the one located immediately downstream. The transition piece should be positioned at a precise location, and the margin of error is often very small. However, cutting the end of line to the right length can be difficult to accomplish in the forest, especially for a worker who is not very experienced. An end of line that becomes inadvertently too short may require the reinstallation of a new flexible tube. If it is too long after a first cut, the end of line will have to be cut again. Even if the worker cuts the end of line to the right length the first time, the various and numerous installation steps inevitably require a minimum of time. Moreover, it will also then be more difficult to readjust the tension of the end of line if it is later found to be too short, especially to decrease the tension. Any repositioning of the end of line, even over a short distance, will also be a challenge.

Another possible method is to wrap the end of line around a tree. This makes it possible to stretch the end of line without using a transition piece and having to cut the flexible tube to a specific length. The upstream end of the end of line can then be attached directly to the outlet of the spout. However, this method requires some expertise to be properly performed and can be difficult for an inexperienced worker. The same problem will occur during any subsequent readjustment of the tension.

There is always room for improvement in the technical field.

SUMMARY

There is provided, among other things, a supporting clamp that can be provided as an anchor point for flexible tubes so as to overcome one or more of the disadvantages in the technical field, whether the disadvantages are the ones mentioned above or others. The proposed supporting clamp is provided to simplify and expedite the installation and maintenance of flexible tubing. In particular, it can significantly reduce or even eliminate kinking of a suspended flexible tube attached to a linear support. This clamp is very advantageous for maple sugaring, but it can also be used in other sectors of activity where flexible tubes are used. Thus, for the sake of simplicity, it must be understood that a direct or indirect reference to sap throughout the present text is only made as an example of implementation. Other kinds of fluids may circulate in the flexible tubes, and the tubing may be installed in a very different environment from that of a sugar bush. The tubing could, among other things, be provided to transport fluids that are only in a gas phase or only in a liquid phase.

There is also provided a clamp that can be used with tubes of various diameters. Each clamp is then much more versatile, and inventory management is also simplified.

Many implementations are possible, depending on the needs. For instance, the clamp may include connection pins or stems for attaching open ends of flexible tubes or components such as spouts, adapters, etc. These connection pins or stems may have a uniform diameter or have a variable diameter which decreases from their base towards their free end, for instance by using several juxtaposed segments each having a distinct diameter. This characteristic then makes it possible to use the same clamp with flexible tubes of different inner diameters or endpieces of multiple inner and outer diameters. This makes it possible to increase the versatility of each of the clamps and further simplifies inventory management.

If desired, the clamp can be provided at the end of line to seal its upstream open end and create an anchor point used to maintain it above the ground. The clamp can be attached to a tree or any other kind of support. Among other things, it can often be attached to a tree by a stub of flexible tube that surrounds a tree trunk. The open ends of this stub can then be inserted on corresponding pins or stems provided on the clamp, which allows to retain them without having to use other kinds of connectors, tools or to make a knot.

If desired, the flexible tube stub provided to support a clamp may be of a contrasting color compared to that of the tubing, or be of a very conspicuous color, for instance bright orange, yellow, red or the like. This feature greatly facilitates quickly finding the location of the ends of line. The installation and maintenance of the tubing network can then be easier, and supervision of the work can be reduced.

In accordance with a first aspect, there is provided a clamp for a flexible tube, the flexible tube including an outer surface and an inner surface, the clamp including: an elongated hollow base, the base having an open top side, two opposite open ends and an inner sidewall which borders a bottom side as well as two opposite lateral sides of the base, the inner sidewall defining a passage extending between the two opposite open ends and through which the flexible tube can pass; a slidable part inserted into the base by one of its ends to close the top side of the base, the slidable part having an inner face and an outer face, the inner face closing the top of the passage, the slidable part having a variable longitudinal position and the passage having a height, defined between the inner face of the slidable part and the inner sidewall to the bottom side of the base, which decreases as a function of the longitudinal position of the slidable part; and the clamp includes at least one guideway allowing the slidable part to be inserted into the base.

Further details on these aspects as well as other aspects of the proposed concept will be apparent from the following detailed description and the appended figures.

BRIEF DESCRIPTION OF THE FIGURES

FIG. 3 is a longitudinal cross-section view of the base in the example shown in FIG. 2.

FIG. 4 is a side view of the slidable part in the example shown in FIG. 2.

FIG. 5 is a view of the end of the slidable part of FIG. 4.

DETAILED DESCRIPTION

Figure 1:
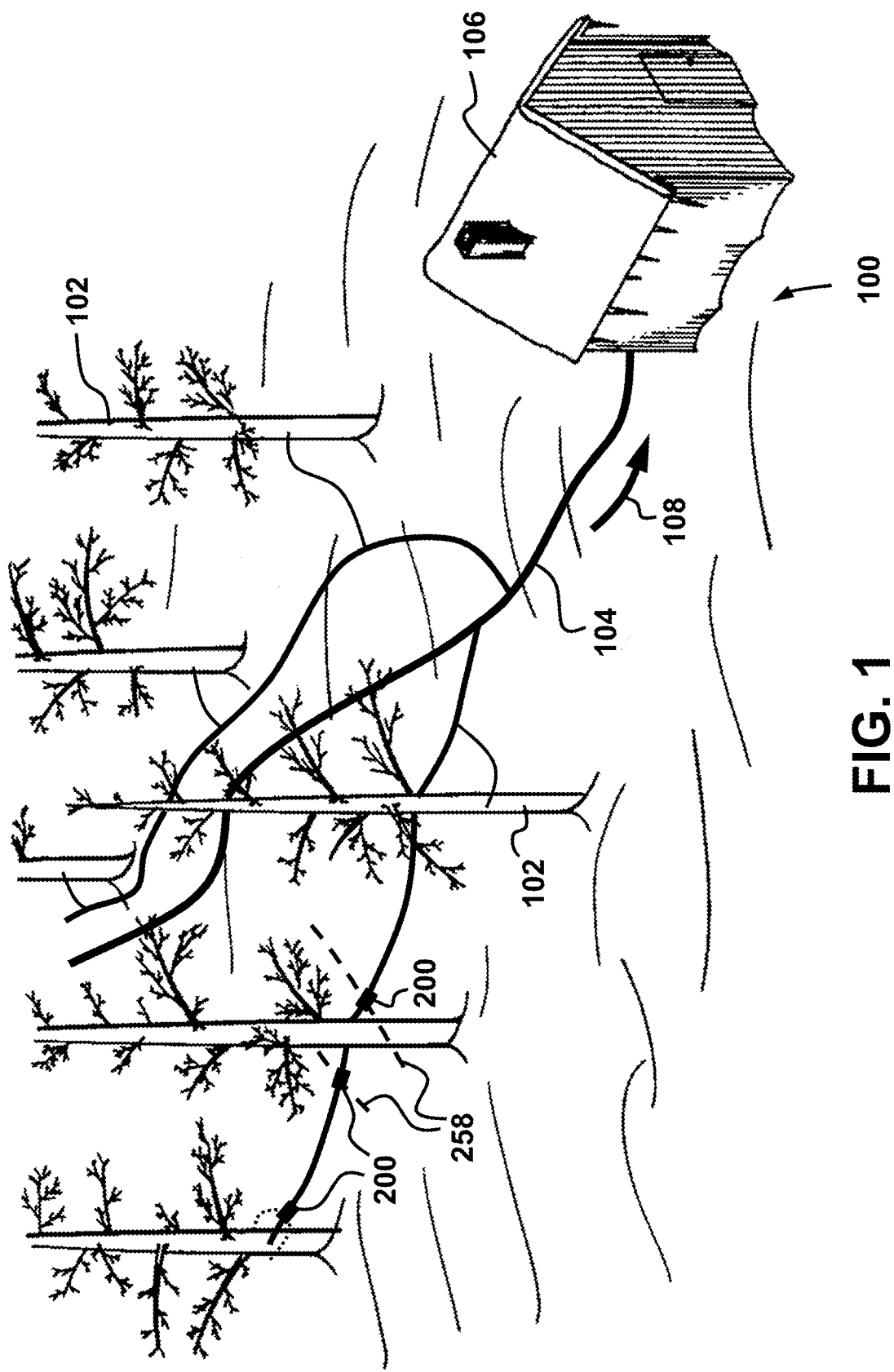
FIG. 1 is a semi-schematic view depicting a simplified example of a facility for harvesting sap from trees.

FIG. 1 is a semi-schematic view depicting a simplified example of a facility 100 for harvesting sap from trees. It is provided to harvest sap from sugar maples 102. The sap is harvested at each tree using a spout inserted in a corresponding tap hole provided through a tree trunk. Each spout is connected to a tubing network 104 of the facility 100 and that is provided to transport the sap towards a destination point, for instance, as shown in FIG. 1, inside a building 106. The sap generally goes into a reservoir, a tank or any other suitable container.

The sap flows inside the tubing network 104 from the numerous spouts towards the building 106 located downstream following a flow direction 108. The interior of the tubing is under a negative pressure, i.e. vacuum pressure, when harvesting sap to facilitate the flow towards the building 106 in addition to the flow under the effect of gravity. This negative pressure may be generated using one or more pumps provided, for instance, inside the building 106 or any other suitable location. Variants are also possible.

It should be noted that the facility 100 shown in FIG. 1 is very simplified. A sugar bush can include several thousand trees and a huge tubing network made of tubes that are increasingly larger in diameter towards the building 106. The building 106 will then be much larger compared to that illustrated in FIG. 1. The general principle of harvesting sap, however, remains the same. Moreover, a tubing network could have several destination points and the same sugar bush could also have several distinct tubing networks. Other variants are possible.

FIG. 1 schematically shows a few supporting clamps 200, which are provided, among other things, to create anchor points at these locations. They thus make it possible to support and keep tensioned suspended segments of flexible tubes 202 of the tubing network 104. It should be noted that in the present text, the word "segment" has a generic non-limitative meaning. It generally refers to the suspended part formed by an uninterrupted length of a same flexible tube 202. In some implementations, the taut portion could also be formed by a plurality of juxtaposed flexible tubes 202.

Flexible tubes in sugar making are usually made of a polymeric material, for instance uncrosslinked polyethylene. Different kinds of polyethylene (low-density polyethylene, linear low-density polyethylene, medium density polyethylene, high-density polyethylene) can be used. A tube is said to be "flexible" when it is relatively soft at ambient temperature and is relatively elastic when stretched in the direction of its length. Various additives can be added to a polymeric material during its manufacturing so as to obtain the desired properties, for instance an increased tensile strength, better resistance to UV rays, better resistance to cracking, etc. Flexible tubes are often transparent or translucent to see the liquid flowing therein. Other kinds of ductile materials and different characteristics are possible, especially for flexible tubes outside the context of sugar making. Some flexible tubes may also be made of a combination of multiple materials, which combination can be flexible and resilient even if some of the materials therein are not.

Figure 2:
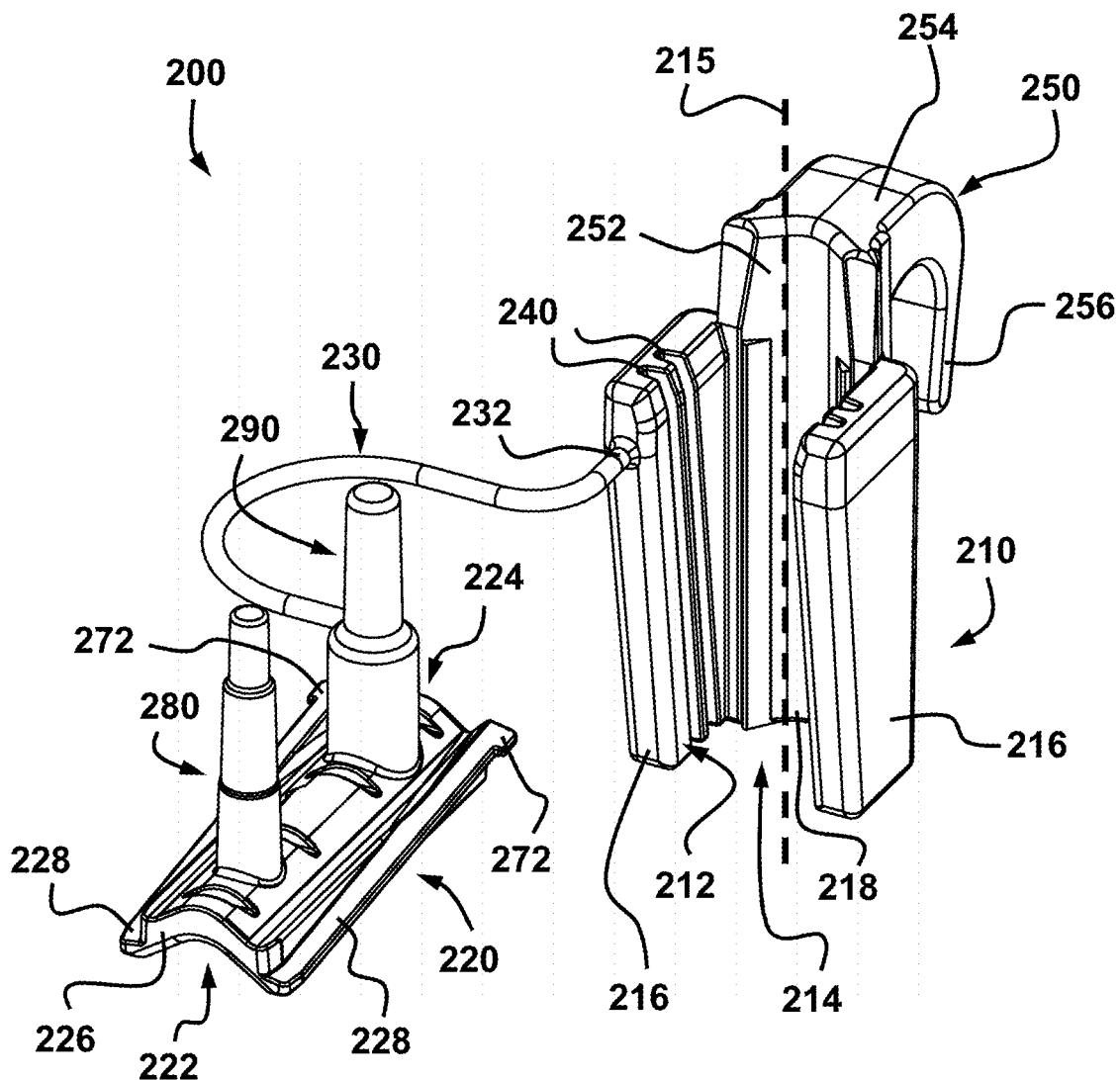
FIG. 2 is an isometric view of an example of a clamp based on the proposed concept.

FIG. 2 is an isometric view of an example of a clamp 200 based on the proposed concept. It should be noted that many other implementations are possible. The proposed concept is therefore not limited to this example or those shown throughout the figures.

The clamp 200 includes, among other things, a base 210. The latter is shown in a top view in FIG. 2 only for the sake of illustration. The base 210 is hollow and includes an inner cavity. The base 210 is also elongated, namely that it is longer than wide. The base 210 has an open top side and two opposite open ends. The closed sides of its cavity, namely its bottom side and its two opposite lateral sides, are bordered by an inner sidewall 212. Variants are possible.

The inner sidewall 212 defines a passage 214 extending between the two opposite open ends along a longitudinal axis 215. The passage 214 is the location of the base 210 through which passes the flexible tube 202 when the clamp 200 supports it. The longitudinal axis 215 is rectilinear in the example but it can be curved or have any another shape in some implementations. Other variants are possible. The longitudinal axis 215 is generally horizontal or almost horizontal in most implementations. As aforesaid, the base 210 is shown from the top in FIG. 2 only for the sake of illustration.

The base 210 of FIG. 2 includes two lateral walls 216 which extend from each lateral side of the passage 214 and which are rigidly connected to one another by an intervening wall 218. The intervening wall 218 in the example is disposed substantially perpendicular to the lateral walls 216 along their bottom edges. The inner sidewall 212 of the base 210 is formed by the interior of the two lateral walls 216 and the intervening wall 218. The various walls 216, 218 are shown as distinct parts in the example shown in FIG. 2. It can nevertheless be different in other implementations. It is possible, for instance, to have a base 210 in which the inner sidewall 212 is formed by the interior of a same continuous wall having a substantially U shape. Other variants are also possible.

The clamp 200 includes a slidable part 220 insertable through one of the ends of the base 210 to lock the flexible tube 202 in position. FIG. 2 shows the slidable part 220 when it is out of the base 210. The top of the passage 214 is then entirely open.

The slidable part 220 has an inner face 222 and an outer face 224, which are disposed opposite one another around a main body 226. Once inserted in the base 210, the inner face 222 will close the top of the passage 214. The main body 226 has an elongated shape in the longitudinal direction, namely along the longitudinal axis 215. The slidable part 220 of the illustrated example also includes lateral edges 228 extending on longitudinal sides of the main body 226. They provide the junction between the base 210 and the slidable part 220 when it is within the base 210. Other variants are also possible.

In the example shown in FIG. 2, the base 210 and the slidable part 220 are always connected to one another by a flexible cord 230 This can simplify handling, among other things. The length of the flexible cord 230 is just enough to allow inserting the slidable part 220 within the base 210. The flexible cord 230 has two opposite ends 232, 234. The end 232 is attached on the top edge of one of the lateral walls 216 of the base 210, more particularly at a location that is relatively close to the end of the base 210 where the slidable part 220 enters. The end 234 is connected at the rear of the slidable part 220, namely at the end opposite to that inserted first within the base 210. Variants in the constructions and the configuration of the flexible cord 230 are nevertheless possible. For instance, the flexible cord 230 could be attached elsewhere. It could also be omitted entirely in some implementations or cut right after its manufacture if desired. Moreover, in many of the subsequent figures, the flexible cord 230 is shown as if it had been cut near its ends 232, 234. This, however, is only for the sake of simplicity in the illustrated examples.

The clamp 200 can be made of an injected-molded thermoplastic material. This allows, among other things, manufacturing the base 210, the slidable part 220 and the flexible cord 230 together. The clamp 200 may, however, be manufactured using other materials or using other manufacturing processes.

The clamp 200 in the example shown in FIG. 2 includes two superimposed guideways 240. The clamp 200 may also include a single guideway 240, three guideways 240 or even more. Each guideway 240 is a separate location where the slidable part 220 can be inserted into the base 210. The presence of several guideway 240 allows the slidable part 220 to be positioned at various heights, thereby allowing the same clamp 200 to be used with flexible tubes 202 of different outer diameters, as needed. Variants are also possible.

The clamp 200 of the example shown in FIG. 2 includes a hook 250 extending under the base 210, namely on the side that is opposite to its open top side. This hook 250 is positioned at the end of an extended portion 252 projecting beyond one of the ends of the intervening wall 218. This extended portion 252 is oriented parallel the longitudinal axis 215. Variants are possible.

FIG. 3 is a longitudinal cross-section view of the base 210 of the example shown in FIG. 2 and shows the left half. The right half of the base 210 is substantially a mirror image of the left side since, with the exception of the end of the flexible cord 230, the two halves are symmetrical in this example. Variants are nevertheless possible. It should be noted that the base 210 was set at the horizontal in FIG. 3 for the sake of illustration. This orientation is also the most common orientation in maple sugaring. The shape of the hook 250 can be best seen in FIG. 3.

As shown in FIGS. 2 and 3, the hook 250 essentially includes two juxtaposed sections 254, 256. The first section 254 is at the base of the hook 250 and projects perpendicularly under the free end of the extended portion 252. The second section 256 is cantilevered with reference to the first section 254. This second section 256 is bent around a transverse axis, namely about an axis perpendicular to the longitudinal axis 215, and it ends pointing slightly towards the bottom of the base 210 in the illustrated example. This hook 250 defines a rounded cavity at the bottom of which a linear support will come to rest. The linear support may be, for instance, a rope, a metal pin (or made of one or more non-metallic materials) or a flexible pipe segment already present at a given location. The convergent orientation of the tip of the second section 256 allows better retention of the linear support in the cavity. The hook 250 could nevertheless be configured differently in other implementations and other kinds of holding elements could be used instead of or even in addition to the hook 250. Moreover, some implementations of the clamp 200 may be without a hook or even any other kind of holders.

FIG. 3 shows, among other things, that in the illustrated example, the top edge of the lateral wall 216 is substantially parallel to the guideways 240. This is also the case for the top edge of the lateral wall 216 on the right. Thus, when viewed from the side, each lateral wall 216 has a profile having a substantially trapezoidal shape. The variation in height makes it possible, among other things, to decrease the quantity of material necessary for the manufacture of each clamp 200. Some implementations could omit this feature or have a different shape compared to that of the illustrated example. Other variants are possible as well.

In the example shown in FIG. 3, the linear support is schematically shown at 258. It is in contact with the bottom of the rounded cavity at a location beyond the corresponding end of the passage 214 along the longitudinal axis 215. The longitudinal spacing between the two is several millimeters. This contact point is identified using reference numeral 264 in FIG. 3 and essentially corresponds to the pivot point of the clamp 200 on the linear support 258. However, it has been found that such longitudinal spacing makes it possible to significantly mitigate, or even alleviate, kinking of the flexible tube 202. Other configurations and arrangements are possible. For instance, in some implementations, the clamp 200 may have a contact point 264 located directly under the passage 214. Other variants are possible as well.

FIG. 3 shows that the guideways 240 of this example are parallel. They are also arranged obliquely, more particularly slopping downwards along the path of the slidable part 220. The height of the passage 214 will decrease depending on the longitudinal position of the slidable part 220. This height is defined between the inner face 222 of the slidable part 220 and the portion of the inner sidewall 212 which is located at the bottom side of the base 210. Other configurations and arrangements are possible.

Each guideway 240 of the example is formed by a pair of grooves, one being located in the lateral wall 216 on the left and the other in the right one. These grooves are completely formed and integrated into the inner sidewall 212 of the base 210. They extend from one end to the other of the base 210 in the example. They may also be shorter and not reach the other end. Other configurations and arrangements are possible. For instance, the guideways 240 could include portions that protrude inwardly of the inner sidewall 212 in addition to, or instead of, the grooves. Other implementations may include a base 210 where guideways 240 are formed by elements on the outer sides of the base 210. The slidable part 220 would then have a corresponding configuration. It is possible to invert the disposition of the elements. Other variants are also possible as well.

FIG. 3 includes two arrows 260, 262 with dashed lines near the inlet of the corresponding groove of each guideway 240. These arrows 260, 262 schematically depict the insertion path of the slidable part 220 in the base 210 for each of the two possible heights in this example.

Each groove of the guideways 240 in the illustrated example includes a stopper 270 to prevent the slidable part 220 from going further when it has reached a limit position along its path. These stoppers 270 correspond to locations where the depth of the corresponding grooves suddenly decreases, thereby creating an obstacle against which will engage a lateral tab 272 projecting on one side of a corresponding lateral edge 228 of the slidable part 220. Both lateral tabs 272 are positioned at the rear end and can be seen in FIG. 2. Other configurations and arrangements are possible. For instance, the lateral tabs 272 could be at another location along the lateral edges 228. Other variants are possible as well.

In the example illustrated in FIG. 3, each groove is divided into two sub-parts, namely a proximal sub-portion, which is that immediately adjacent to the entry of the guideway 240, and a distal sub-portion located farther in the direction of the insertion of the slidable part 220. The distal sub-portion is slightly shallower than the proximal sub-portion. The two are separated by the stopper 270. The lateral tabs 272 on the slidable part 220 can be slid along their corresponding proximal sub-portion but they cannot pass the stopper 270 once they reach an end position. Variants are also possible. For instance, the stopper 270 could be configured very differently in some implementations. It may correspond to a separate element which protrudes from the bottom of the groove towards the center of the base 210 at a precise point while the remainder of the groove is of uniform depth. Other variants may be devised, and the stoppers may be omitted, in some implementations, whether for one or all of the guideways 240.

FIG. 4 is a side view of the slidable part 220 in the example illustrated in FIG. 2. The slidable part 220 is disposed horizontally and is now parallel to the longitudinal axis 215. The end of the slidable part 220, which is on the left in FIG. 4, is the one that will be inserted first into one of the guideways 240. This end is referred to hereinafter as the front end. The opposite end is the rear end. The length of the slidable part 220 along the longitudinal axis 215 corresponds approximately to the length of the base 210. Variants are nevertheless possible.

As shown in FIG. 4, the lateral edges 228 of the slidable part 220 of the example are essentially rectilinear and they are arranged obliquely at an angle of inclination which corresponds substantially to that of the guideways 240 illustrated in FIG. 3. Variants are however possible, and the various elements could be configured differently.

FIG. 4 shows that the slidable part 220 includes two spaced apart pins 280, 290. These pins 280, 290 project perpendicularly out of the outer face 224 of the slidable part 220. More details about these pins 280, 290 are given hereafter. Other configurations and arrangements are possible. For instance, one or both of the pins 280, 290 could be omitted in some implementations. Other variants are also possible as well.

FIG. 4 also shows that in the example, the outer face 224 of the slidable part 220 includes spaced apart transverse notches 224a. These notches 224a can be useful for moving the slidable part 220 using a tool, for instance the end of a flat screwdriver if this is necessary for any specific reason. Other configurations and arrangements are possible. For instance, these notches 224a could be configured differently, or even omitted, in some implementations. Other variants are also possible as well.

FIG. 5 is a view of the rear end of the slidable part 220 of FIG. 4.

The lateral profile of the inner face 222 of the slidable part 220 in the example illustrated in FIG. 4 is substantially rectilinear in the direction of the longitudinal axis 215. Other configurations and arrangements are possible. For instance, the guideways 240 could be straight or less inclined and the inner face 222 could then be inclined to decrease the height of the passage 214 depending on the longitudinal position of the slidable part 220. Other variants are possible.

Figure 9:
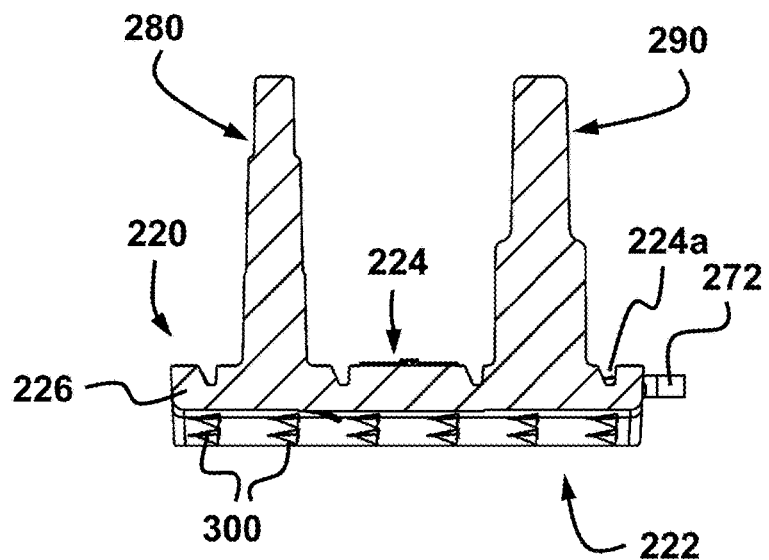
FIG. 9 is a longitudinal cross-section view of the flexible tube in the example shown in FIG. 2.

As shown in FIG. 5, the inner face 222 of the slidable part 220 is concave in the transverse direction. This curved shape allows it to better fit the shape above a flexible tube 202. Moreover, several spaced teeth 300 protrude under the surface of the inner face 222 in the example. The teeth 300 have a substantially triangular shape and are arranged in longitudinal rows (FIG. 9). There are four rows in this example. The teeth 300 are rearwardly oriented to provide better engagement between the inner face 222 of the slidable part 220 and the flexible tube 202 in the direction of the tension. Variants are possible.

When installing the clamp 200 to support a flexible tube 202, the base 210 of the clamp 200 is inserted around the flexible tube 202 where an anchor point is required. The flexible tube 202 can enter laterally into the base 210 when the slidable part 220 is not inserted therein. Otherwise, when the slidable part 220 is only very slightly inserted into the base 210, the free end of the flexible tube 202 can be inserted directly into the passage 214 by one end of the base 210 and be pushed until it comes out at the opposite end.

The slidable part 220 can be inserted or further inserted into the base 210 when the flexible tube 202 is in place in the passage 214 to create the mechanical connection. The bottom of the flexible tube 202 will then be engaged against the bottom of the base 210. The slidable part 220 should be moved until its inner face 222 firmly engages the top of the flexible tube 202.

Figure 6:
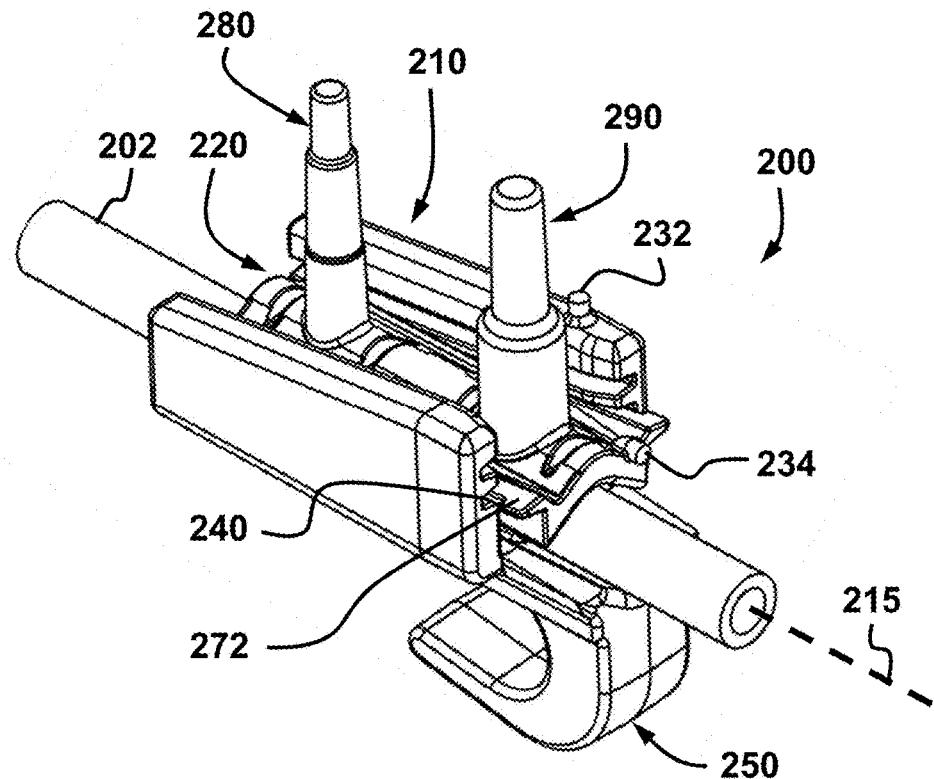
FIG. 6 is an isometric view of the clamp in the example of FIG. 2.

FIG. 6 is an isometric view of the clamp 200 in the example of FIG. 2 when set on a flexible tube 202. The flexible tube 202 was previously inserted through the passage 214 of the base 210 so that the clamp 200 can be positioned where the anchor point is needed along the flexible tube 202. The slidable part 220 was then inserted into one of the guideways 240. It is the guideway 240 located at the bottom in this example. The slidable part 220 was subsequently pushed until it reached the illustrated position, namely a position where teeth 300 lightly engages the top of the flexible tube 202.

Figure 7:
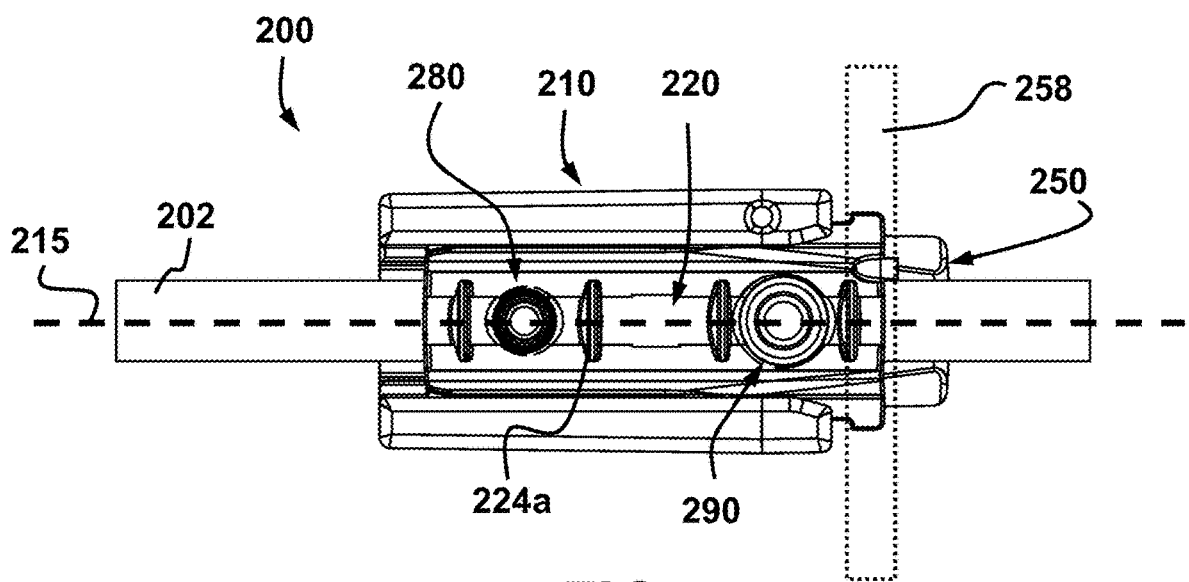
FIG. 7 is a top view of the clamp and the flexible tube shown in FIG. 6.

FIG. 7 is a top view of the clamp 200 and the flexible tube 202 shown in FIG. 6.

Figure 8:
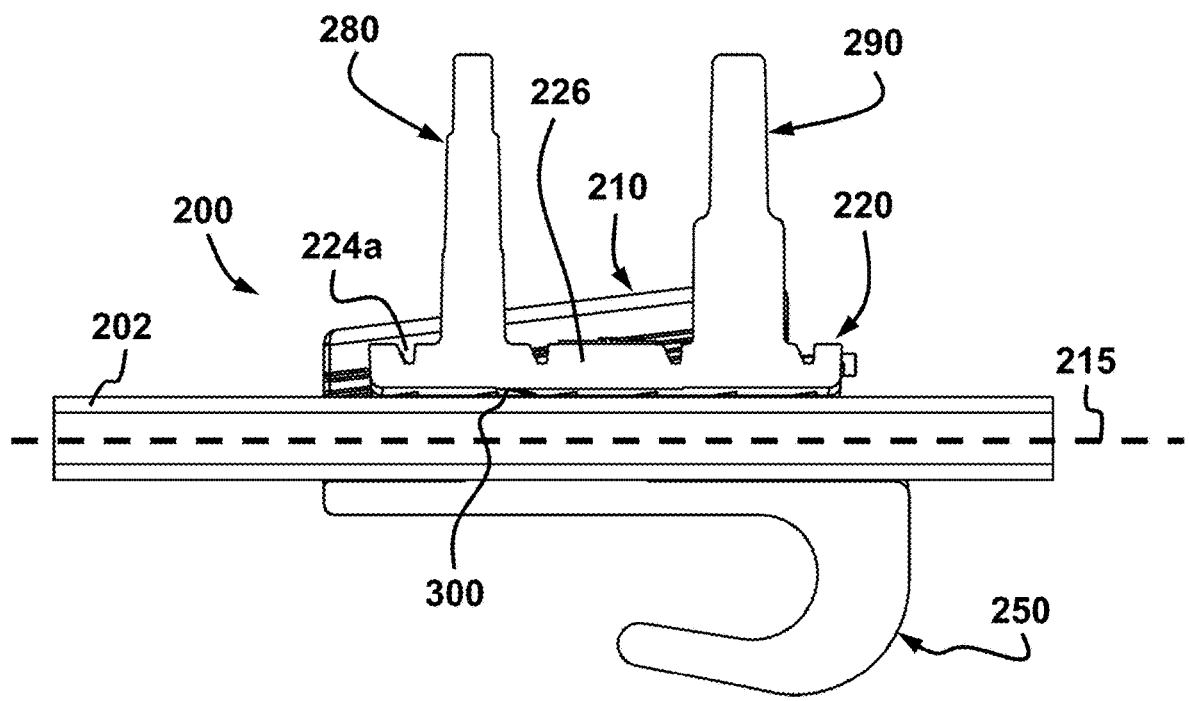
FIG. 8 is a longitudinal cross-section view of the clamp and the flexible tube of FIG. 6.

FIG. 8 is a longitudinal sectional view of the clamp 200 and the flexible tube 202 of FIG. 6. FIG. 8 shows that the entire inner face 222 of the slidable part 220 remains parallel to the top of the flexible tube 202 when it moves along the guideways 240 in the example. Variants are nevertheless possible and the clamp 200 could be configured differently in some implementations.

FIG. 9 is a longitudinal cross section view of the slidable part 220 in the example shown in FIG. 2. The configuration and the arrangement of the teeth 300 are best shown in FIG. 9. Variants are also possible.

Figure 10:
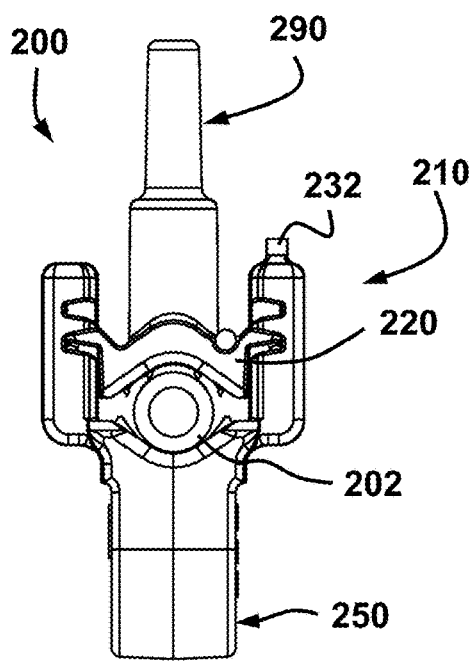
FIG. 10 is an elevation view of the end of the clamp that corresponds to the one at the right in FIG. 8.
Figure 11:
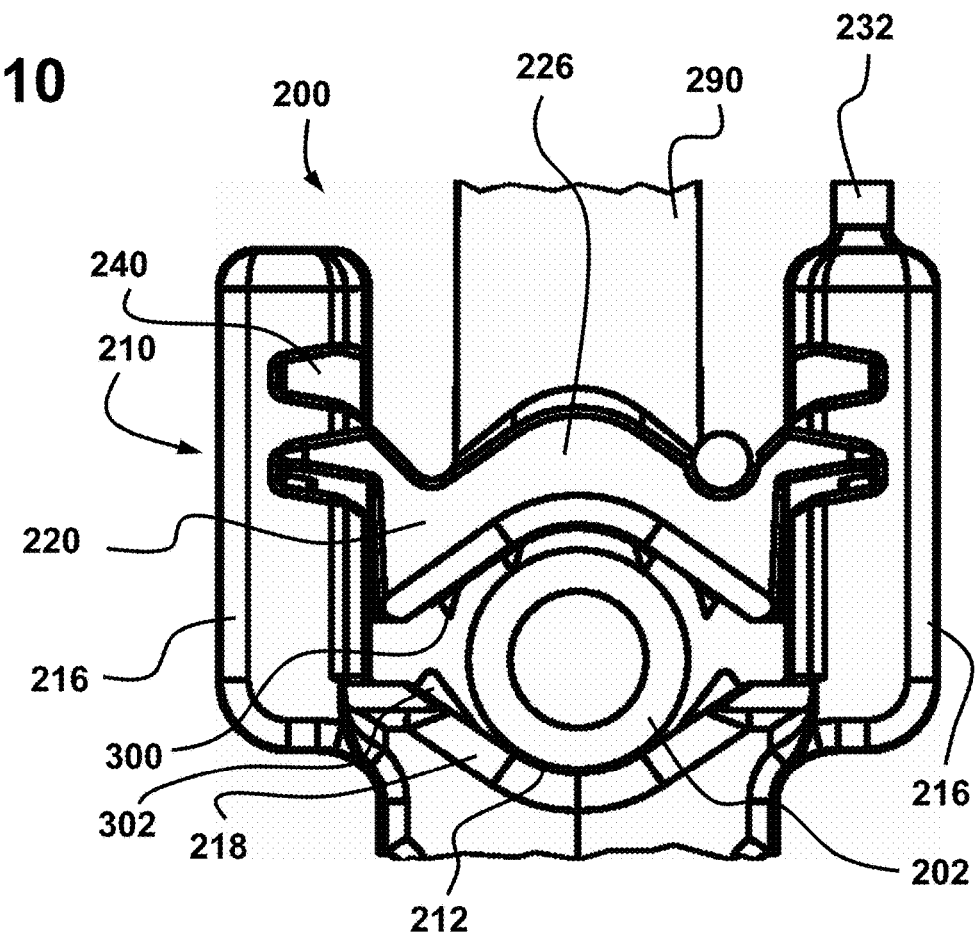
FIG. 11 is an enlarged view of the clamp and the flexible tube of FIG. 10.

FIG. 10 is an elevational view of the end of the clamp 200 which corresponds to the right one in FIG. 8. FIG. 11 is an enlarged view of the clamp 200 and the flexible tube 202 of FIG. 10.

As can be seen, particularly in FIGS. 8, 10 and 11, the slidable part 220 is at a position where its inner face 222 engages the top of the outer surface of the flexible tube 202 through the teeth 300 at the center. However, they exert a relatively weak force, and they do not cause visible deformation of the flexible tube 202. The bottom of the flexible tube 202 is wedged against the bottom of the inner sidewall 212 and the flexible tube 202 does not touch the rest of the inner sidewall 212. This portion of the inner sidewall 212 corresponds to the top face of the intervening wall 218 in the example. It is concave in the transverse plane over a portion of the width, as shown in FIGS. 10 and 11. It is also symmetrical. The concave portion makes it possible to better adapt to the circular shape of the flexible tube 202 and to center it in the base 210. Other configurations and arrangements are possible. For instance, the bottom of the inner sidewall 212 may not be parallel to the longitudinal axis 215. The shape of the bottom profile of the inner sidewall 212 may be different from that illustrated, including not being concave, not be symmetrical, or both. Other variants are possible as well.

The concave portion is bordered by longitudinal ribs 302 present on the sides and which elevate them in the example.

These ribs 302 are inverted V-shaped and have a top pointing upwards. They can also be seen in other figures, for instance in FIG. 2. They contribute to supporting the sides of a flexible tube 202 having a larger outer diameter. Variants are possible, however, and may be omitted in some implementations.

Figure 12:
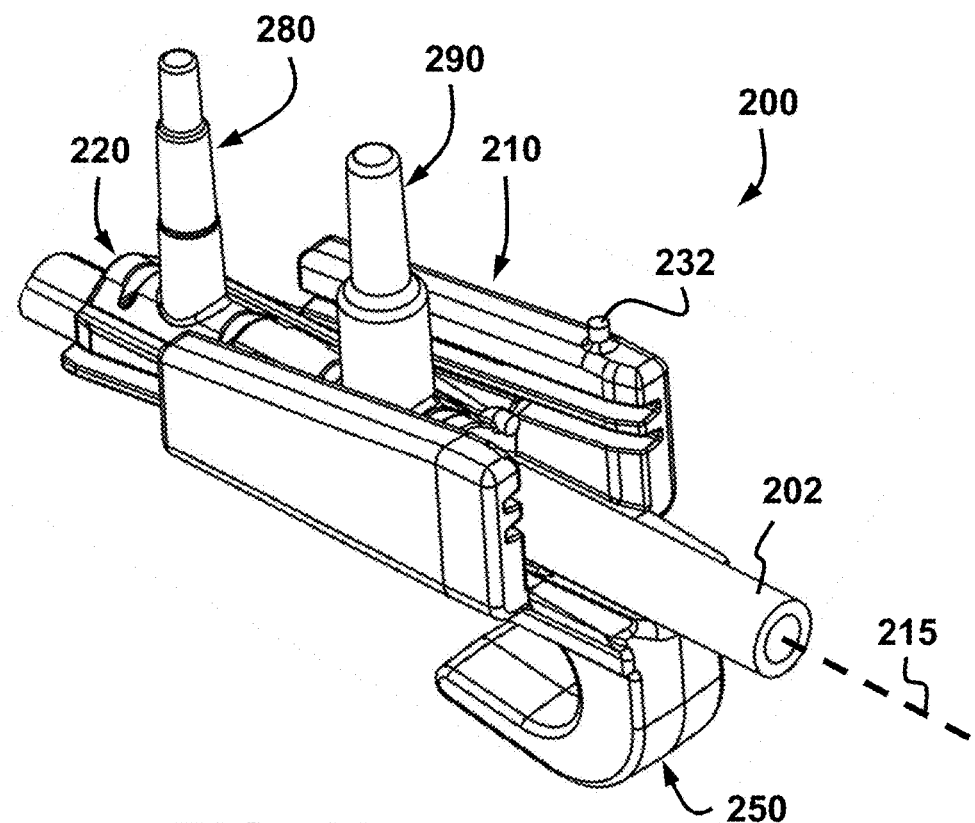
FIG. 12 is an isometric view similar to FIG. 6 but showing the slidable part that is now inserted up to its end position so as to hold the flexible tube using an increased force.

FIG. 12 is an isometric view similar to FIG. 6 but shows the slidable part 220 being now inserted up to the end position so as to hold the flexible tube 202 with an increased force or even a maximum force. The lateral tabs 272 of the slidable part 220 engage the stoppers 270 of the right and left grooves of the corresponding guideways 240. A portion of the slidable part 220 has passed the corresponding end of the base 210. Variants are possible.

Figure 13:
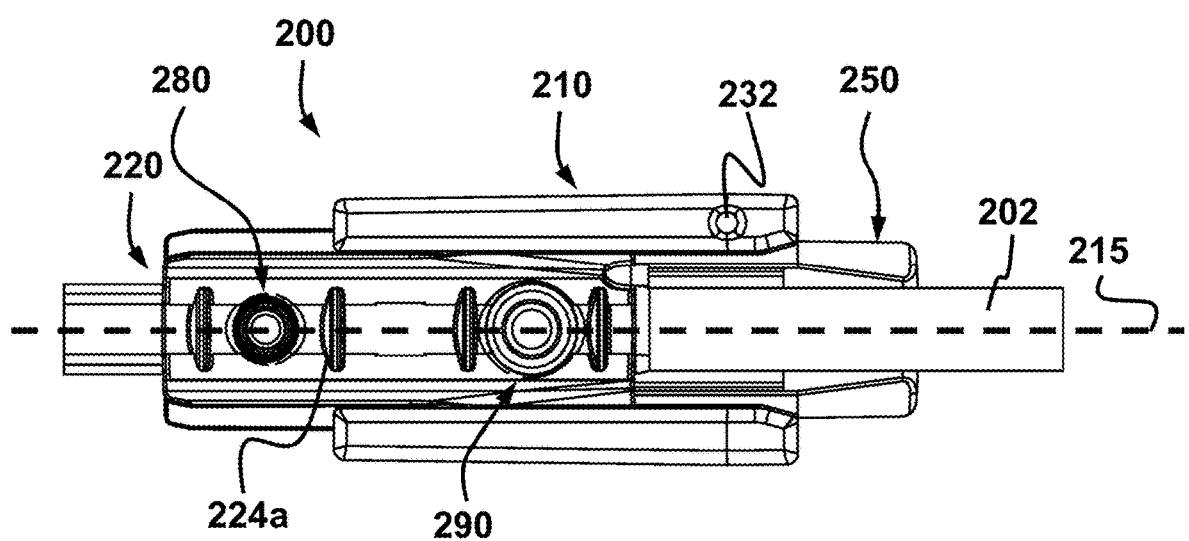
FIG. 13 is a top view of the clamp and the flexible tube of FIG. 12.

FIG. 13 is a top view of the clamp 200 and the flexible tube 202 of FIG. 12.

Figure 14:
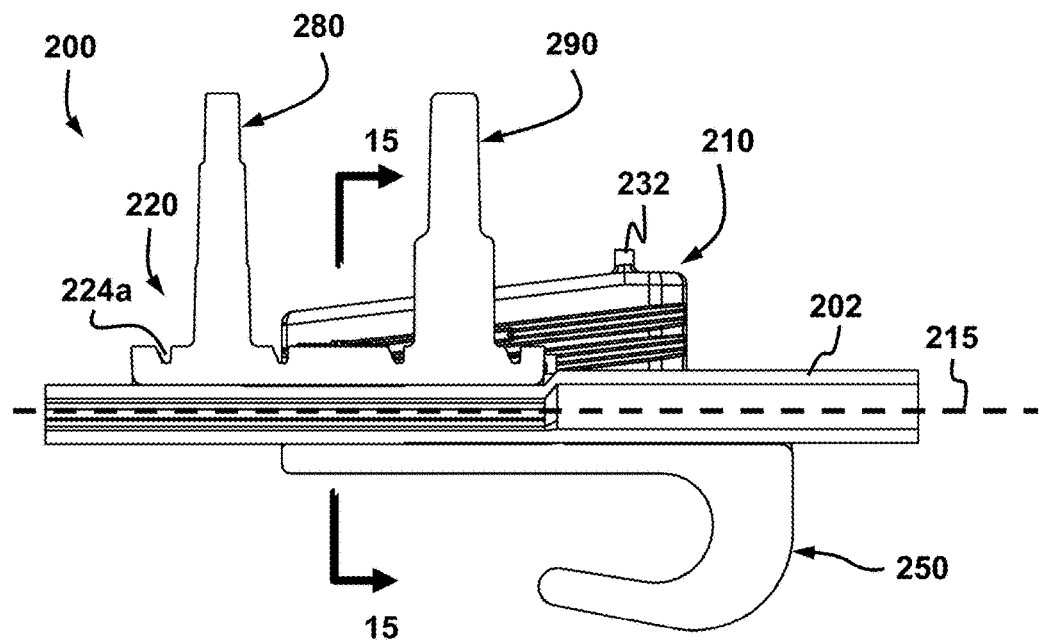
FIG. 14 is a longitudinal cross-section view of the clamp and the flexible tube of FIG. 12.

FIG. 14 is a view in longitudinal cross section of the clamp 200 and the flexible tube 202 of FIG. 12. As can be seen in this figure, the inner face 222 of the slidable part 220 is very firmly in engagement against the top outer surface of the flexible tube 202 and exerts a radial force on the flexible tube 202 which deforms it. The distortion shown in FIG. 14 has been exaggerated for the sake of illustration. The teeth 300 are then completely wedged in the outer surface of the flexible tube 202 but even in this case, the teeth 300 do not pierce the wall of the flexible tube 202.

Figure 15:
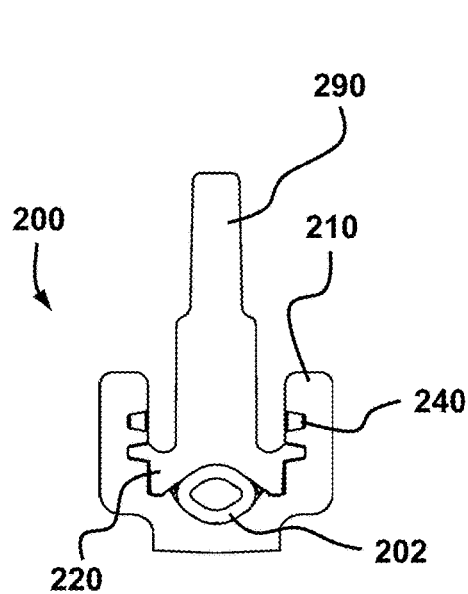
FIG. 15 is a cross-section view along line 15-15 in FIG. 14.

FIG. 15 is a cross-section view taken along line 15-15 in FIG. 14. It can be seen that the high force exerted by the slidable part 220 on top of the flexible tube 202 gives it a shape that is no longer circular. This form is now essentially oblong. In general, the flexible tube 202 can later return to its original shape when the clamp 200 is removed. Variants are possible.

Figure 16:
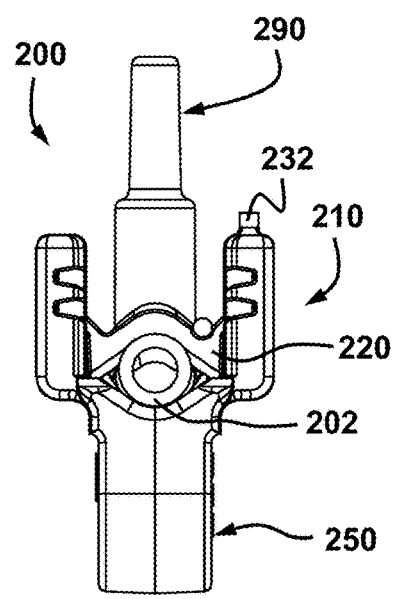
FIG. 16 is an elevation view of the end of the clamp that corresponds to the one at the right in FIG. 14.

FIG. 16 is an elevation view of the end of the clamp 200 that corresponds to the one at the right in FIG. 14. It thus shows the undeformed end of the flexible tube 202.

Figure 17:
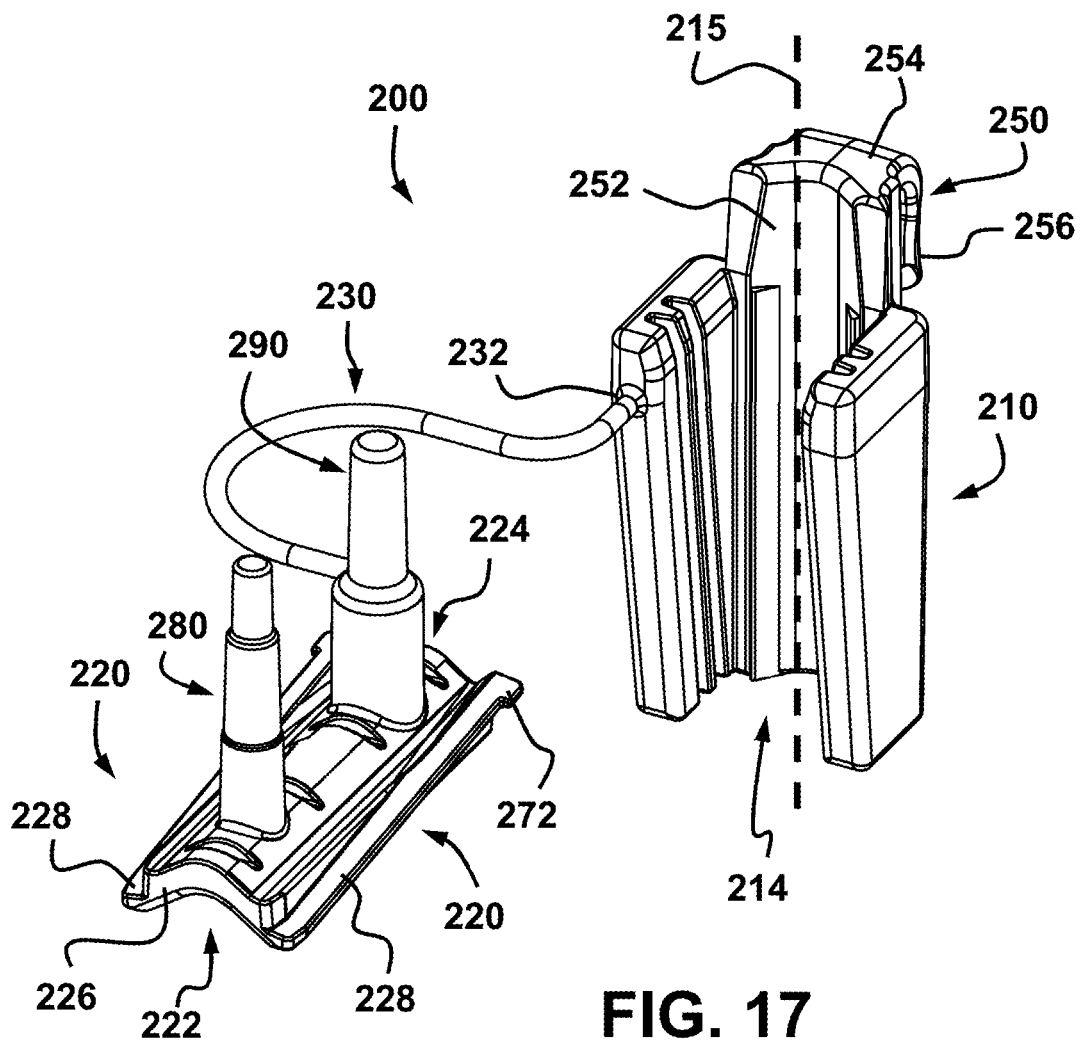
FIG. 17 is an isometric view of another example of a supporting clamp based on the proposed concept.
Figure 18:
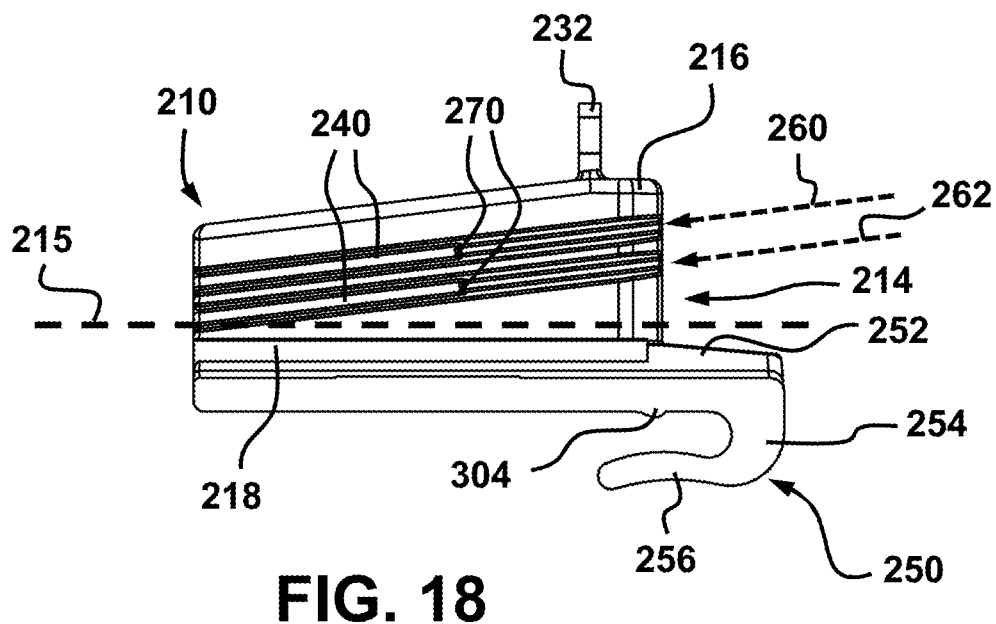
FIG. 18 is a longitudinal cross-section side view of the base in the example shown in FIG. 17.

FIG. 17 is an isometric view of another example of a supporting clamp 200 in accordance with the proposed concept. FIG. 18 is a longitudinal cross-section side view of the base 210 in the example shown in FIG. 17. The example of FIGS. 17 and 18 is similar to that of FIG. 2, with the exception of the shape of the hook 250. Besides this hook, the foregoing description concerning FIGS. 2 to 16 are also entirely applicable to this example. The corresponding parts are identified using the same reference numerals.

FIG. 18 shows that the clamp 200 in this example includes an outer embossment 304 on the top of the base 210 to firmly retain a linear support 258. This feature may be omitted in some implementations.

Figure 19:
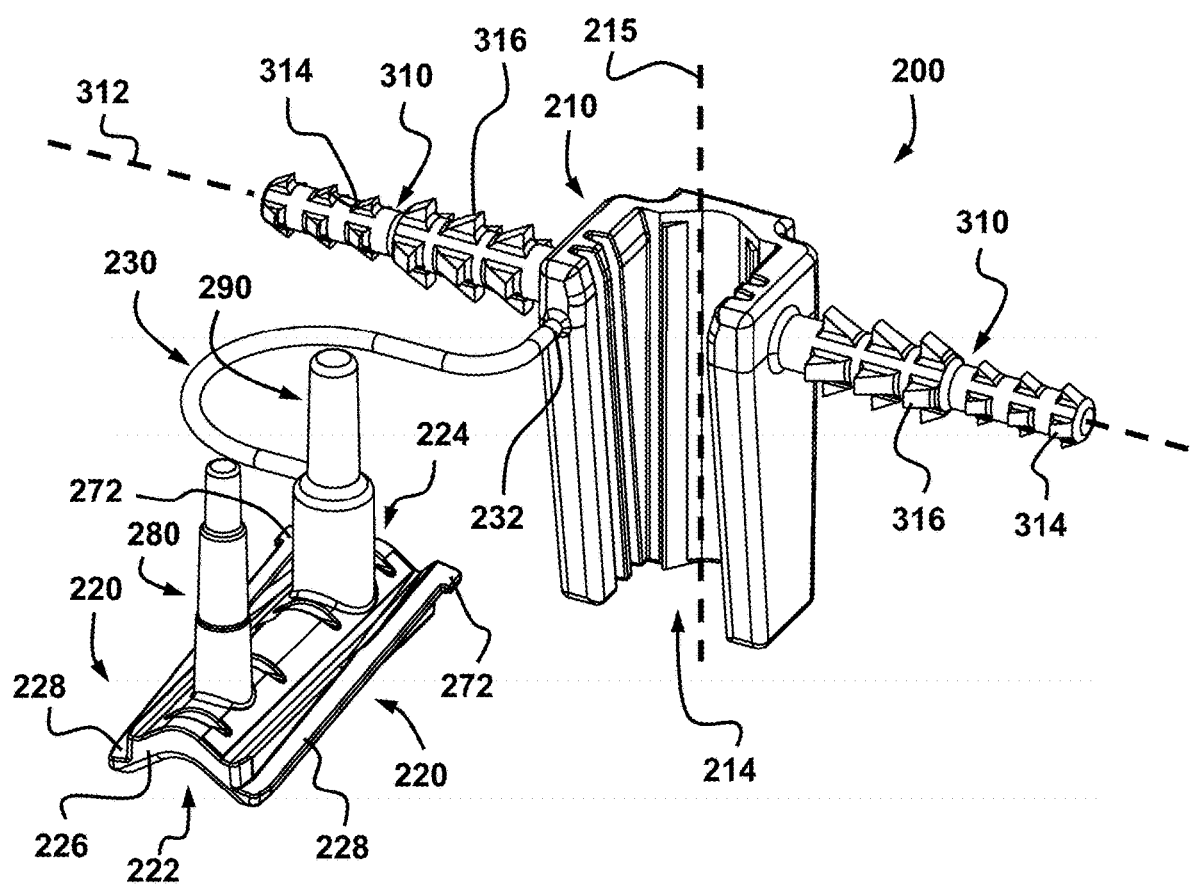
FIG. 19 is an isometric view of another example of a supporting clamp based on the proposed concept.
Figure 20:
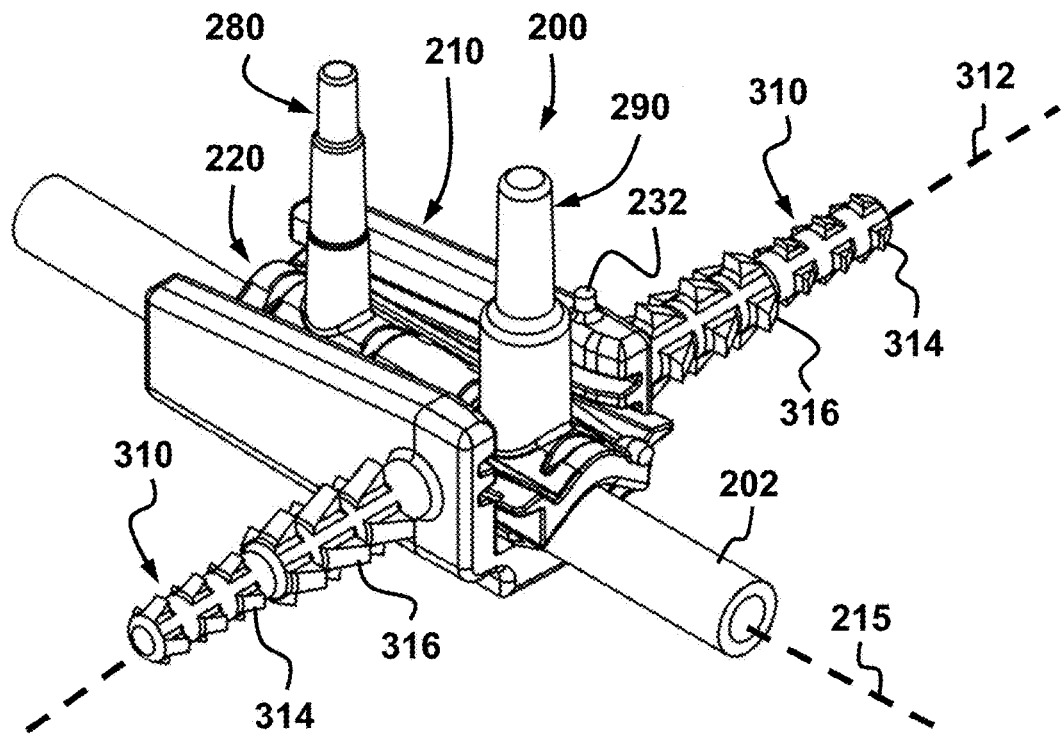
FIG. 20 is an isometric view of the clamp in the example shown in FIG. 19 when positioned on a flexible tube.
Figure 21:
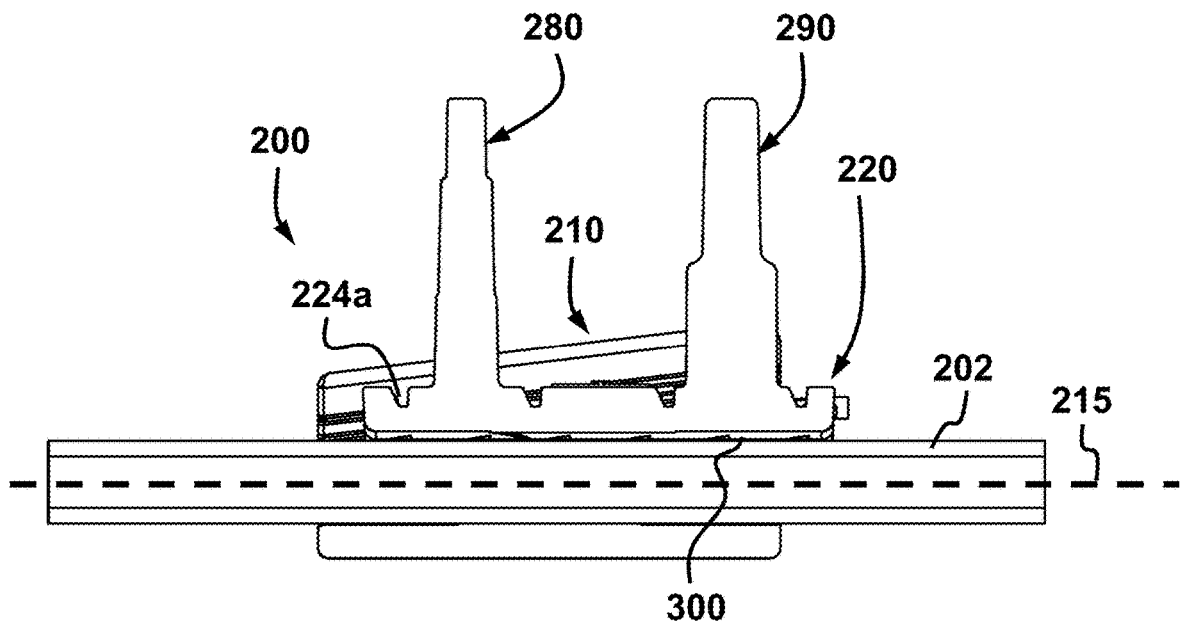
FIG. 21 is a longitudinal cross-section side view of the clamp and the flexible tube in FIG. 20.

FIG. 19 is an isometric view of another example of a supporting clamp 200 based on the proposed concept. This example is also similar to that of FIG. 2 and the corresponding parts are designated by the same reference numerals. The hook, however, is absent and the clamp 200 includes toothed lateral stems 310. Only these differences are described hereafter in order to avoid unnecessary repetitions. The foregoing description about FIGS. 2 to 16 applies to the example of FIG. 19. This clamp 200 is also shown in FIGS. 20 and 21. It is possible to have a hook in addition to one or several toothed stems 310.

FIG. 20 is an isometric view of the clamp 200 of the example shown in FIG. 19 when it is set on a flexible tube 202. FIG. 21 is a longitudinal cross-section side view of the clamp 200 and the flexible tube 202 of FIG. 20.

The clamp 200 in the example of FIGS. 19 to 21 includes two stems 310 which project perpendicularly to respective sides of the base 210. These stems 310 have identical or very similar shape and size, and are arranged coaxially on a transverse axis 312. This transverse axis 312 is positioned near the end of the base 210 through which the slidable part 220 is inserted. Variants are possible. For instance, in some implementations, at least one of the stems 310 may not be perpendicular to one side of the base 210. The stems 310 may have distinct shape, size, or both. They may not be coaxial, transversal, or both. At least one of the stems 310 may not be located near the end of the base 210 through which the slidable part 220 is inserted. Other variants are also possible.

The stems 310 of the clamp 200 in the example of FIGS. 19 to 21 include two outer diameters formed by axially and radially spaced teeth 314, 316. The teeth 314,316 have a profile that is triangular and has an oblique outward face. The teeth 314, 316 are configured to create increased resistance to removal of a flexible tube 202 that is inserted on the stems 310. The teeth 314, 316 have sizes that vary from section to section. In the example, the teeth 314 are located in a distal section of the stem 310 while the larger teeth 316 are located on a proximal section. Both sizes of teeth 314, 316 can accommodate tubes of at least two different diameters. The example also shows that the teeth 314, 316 are arranged in groups of four along the stems 310 and are disposed in a cruciform radial arrangement when viewed in the direction of the transverse axis 312. The cruciform arrangement allows, among other things, a maximum retention but remains relatively easy to remove by hand. Other configurations or tooth shapes are nevertheless possible. The teeth 314, 316 could also be omitted in some implementations.

Figure 22:
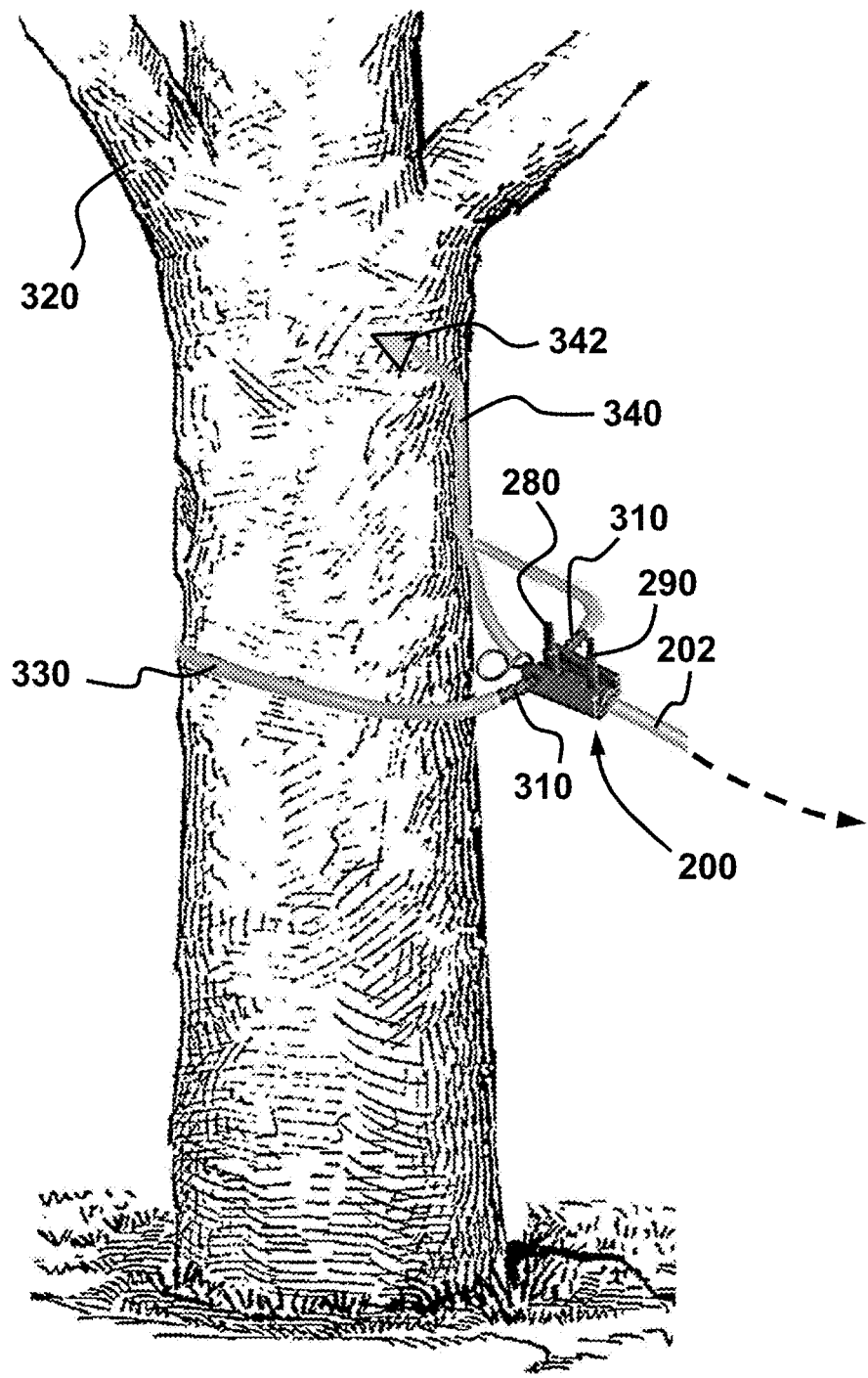
FIG. 22 is a semi-schematic isometric view of the clamp and the flexible tube of FIG. 20 when the clamp is supported by a tree.

FIG. 22 is a semi-schematic isometric view of the clamp 200 and the flexible tube 202 of FIG. 20 when the clamp 200 is supported by a tree 320. The clamp 200 is attached to the tree by a flexible tube stub 330 which surrounds the trunk of the tree 320 and which is used only for mechanical support purposes. The open ends of this stub 330 are inserted on corresponding stems 310 provided on the clamp 200, which allows to retain them without using other kinds of connectors, tools or to make a knot. The installation can be done very quickly by hand and it is therefore not necessary for the flexible tube 202 itself to go around the tree 320. The adjustment of the tension at the end of line will be very simple and can be done whenever required by changing the position of the clamp 200 along the flexible tube 202.

FIG. 22 also shows that the clamp 200 as shown allows the short portion of the end of line upstream of the clamp 200, which is identified by the reference numeral 340, to be used in a manner similar to a flexible junction tube since the forces involved in supporting and stretching the end of line are transmitted to the clamp 200 and the flexible tube stub 330. However, unlike a conventional flexible junction tube, there is no transition piece because it is a continuation of the same segment of flexible tube 202. The end of the portion 340 may be connected to a spout 342, as schematically shown in FIG. 22, or to any other object. This end of the portion 340 may also be closed, for instance by fixing it on one of the pins 280, 290. Other variants are also possible.

The flexible tube stub 330 provided to support a clamp 200 may be of a contrasting color compared to that of the tubing, or be of a very conspicuous color, for instance bright orange, yellow, red or the like. This feature greatly facilitates quickly finding the location of the ends of line, thereby significantly decreasing the time generally required for such task. The installation and maintenance of the tubing network can then be much faster, and supervision of the work can be reduced. Variants are nevertheless possible and the use of very bright or bright color tubes could be omitted in some installations.

The clamp 200 in accordance with the proposed concept is very advantageous for the ends of lines. It can nevertheless be used at other locations within the tubing network, as shown schematically in FIG. 1. The clamp 200 is easy to install manually, without tools, and allows the flexible tubes 202 to be adjusted at any time, still without tools, and without having to cut the tubes. Significant time savings can be achieved and ultimately, the workforce requirements are lowered.

The present detailed description and the appended figures are meant to be exemplary only, and a skilled person will recognize that variants can be made in light of a review of the present disclosure without departing from the proposed concept.

LIST OF REFERENCE NUMERALS 100 facility
102 sugar maple
104 tubing network
106 building
108 flow direction
200 supporting clamp
202 flexible tube
210 base
212 inner sidewall (within the base)
214 passage (within the base)
215 longitudinal axis
216 lateral wall
218 intervening wall
220 slidable part
222 inner face (of the slidable part)
224 outer face (of the slidable part)
224a notch (on the outer face)
226 main body (of the slidable part)
228 lateral edge (of the slidable part)
230 flexible cord
232 end (of the flexible cord)
234 end (of the flexible cord)
240 guideway
250 hook
252 extended portion (of the base)
254 first section (of the hook)
256 second section (of the hook)
258 linear support
260 arrow
262 arrow
264 contact point
270 stopper (in a groove)
272 lateral tab (on the slidable part)
280 pin
290 pin
300 tooth
302 rib
304 outer embossment
310 stem
312 transversal axis
314 tooth (on the stems)
316 tooth (on the stems)
320 tree
330 flexible tube stub
340 portion that is upstream the clamp (FIG. 22)
342 spout

What is claimed is:

1. A clamp for a flexible tube, the flexible tube including an outer surface and an inner surface, the clamp including:
a hollow base of elongate shape, the base having an open top side, two opposite open ends, and an inner sidewall bordering a bottom side and two opposite lateral sides of the base, the inner sidewall defining a passage extending between the two opposite open ends and through which the flexible tube can pass;
a slidable part inserted into the base at one of its ends to close the top open side of the base, the slidable part having an inner face and an outer face, the inner face closing the top of the passage, the slidable part having a variable longitudinal position and the passage having a height, defined between the inner face of the slidable part and the inner sidewall to the bottom side of the base, which decreases as a function of the longitudinal position of the slidable part;
the clamp includes at least one guideway allowing the slidable part to fit into the base; and
the slidable part includes at least one elongate pin projecting from the outer face.

2. The clamp according to claim 1, wherein the clamp includes at least two superimposed guideways allowing the slidable part to be inserted into the base at various heights.

3. The clamp according to claim 1, wherein each guideway is disposed in an oblique path which defines a downward angle in a longitudinal direction.

4. The clamp according to claim 1, wherein each guideway is formed by a pair of opposed grooves, each groove being provided on one of the corresponding lateral sides of the base.

5. The clamp according to claim 4, wherein each groove includes a stopper for limiting a displacement of the slidable part along the corresponding guideway, the slidable part including lateral tabs which project on respective opposite sides and engage the stoppers at an end position.

6. The clamp according to claim 1, wherein the slidable part is permanently attached to the base by a flexible cord.

7. The clamp according to claim 1, wherein the inner sidewall has a rounded cross-sectional profile above the bottom side of the base.

8. The clamp according to claim 1, wherein the clamp includes an extended portion extending axially beyond one of the ends of the base and which is a continuation of the bottom side of the base, the clamp further including a hook which projects under the extended portion, the hook having an internal attachment point which is located beyond the end of the base of which extended portion extends.

9. The clamp according to claim 1, wherein each pin comprises at least two juxtaposed cylindrical sections having different diameters.

10. The clamp according to claim 9, wherein each pin comprises at least two juxtaposed cylindrical sections having different diameters, all cylindrical sections of the two pins having different diameters.

11. The clamp according to claim 1, wherein the at least one elongate pin are two in number, the two pins being spaced from one another and being perpendicular to the outer face.

12. A clamp for a flexible tube, the flexible tube including an outer surface and an inner surface, the clamp including:
a hollow base of elongate shape, the base having an open top side, two opposite open ends, and an inner sidewall bordering a bottom side and two opposite lateral sides of the base, the inner sidewall defining a passage extending between the two opposite open ends and through which the flexible tube can pass;

a slidable part inserted into the base at one of its ends to close the top open side of the base, the slidable part having an inner face and an outer face, the inner face closing the top of the passage, the slidable part having a variable longitudinal position and the passage having a height, defined between the inner face of the slidable part and the inner sidewall to the bottom side of the base, which decreases as a function of the longitudinal position of the slidable part; and the clamp includes at least one guideway allowing the slidable part to fit into the base; and the clamp further includes at least one pair of elongate stems, each stem projecting laterally on a respective one of the lateral sides of the base.

13. The clamp according to claim 12, wherein the clamp includes at least one of the following features:

the stems of each pair are arranged coaxially; and each stem includes at least two juxtaposed cylindrical sections having different diameters.

14. The clamp according to claim 12, wherein each stem includes teeth disposed around a central axis.

15. The clamp according to claim 14, wherein the teeth of each stem are arranged in a cruciform radial arrangement.

16. The clamp according to claim 12, wherein the clamp includes at least two superimposed guideways allowing the slidable part to be inserted into the base at various heights.

17. The clamp according to claim 12, wherein each guideway is disposed in an oblique path which defines a downward angle in a longitudinal direction.

18. The clamp according to claim 12, wherein each guideway is formed by a pair of opposed grooves, each groove being provided on one of the corresponding lateral sides of the base.

19. The clamp according to claim 12, wherein the slidable part is permanently attached to the base by a flexible cord.

20. The clamp according to claim 12, wherein the clamp includes an extended portion extending axially beyond one of the ends of the base and which is a continuation of the bottom side of the base, the clamp further including a hook which projects under the extended portion, the hook having an internal attachment point which is located beyond the end of the base of which extended portion extends.

* * * * *